(12) United States Patent
Beeler et al.

(10) Patent No.: US 9,477,878 B2
(45) Date of Patent: Oct. 25, 2016

(54) RIGID STABILIZATION OF FACIAL EXPRESSIONS

(71) Applicant: DISNEY ENTERPRISES, INC., Burbank, CA (US)

(72) Inventors: Thabo Beeler, Zurich (CH); Derek Bradley, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 100 days.

(21) Appl. No.: 14/497,208

(22) Filed: Sep. 25, 2014

(65) Prior Publication Data

US 2015/0213307 A1    Jul. 30, 2015

Related U.S. Application Data

(60) Provisional application No. 61/932,751, filed on Jan. 28, 2014.

(51) Int. Cl.
  *G06K 9/00* (2006.01)
  *G06T 13/40* (2011.01)

(52) U.S. Cl.
  CPC ........... *G06K 9/00302* (2013.01); *G06T 13/40* (2013.01)

(58) Field of Classification Search
  None
  See application file for complete search history.

(56) References Cited

U.S. PATENT DOCUMENTS

| | | | | |
|---|---|---|---|---|
| 5,774,591 A * | 6/1998 | Black | ................ | G06K 9/00315 382/118 |
| 5,802,220 A * | 9/1998 | Black | ................ | G06K 9/00248 382/100 |
| 5,926,575 A * | 7/1999 | Ohzeki | ................ | G06T 9/001 382/118 |
| 7,801,345 B2 * | 9/2010 | Fang | ................ | G06T 7/608 382/128 |
| 2001/0051535 A1 * | 12/2001 | Kamimura | ............ | H04M 1/253 455/566 |
| 2002/0054039 A1 * | 5/2002 | Lei | ............ | G09G 5/00 345/419 |
| 2005/0084140 A1 * | 4/2005 | Kakadiaris | ......... | G06K 9/00288 382/118 |
| 2006/0111631 A1 * | 5/2006 | Kelliher | ................ | G06T 5/50 600/425 |
| 2012/0007859 A1 * | 1/2012 | Lee | ................ | G06T 13/40 345/419 |
| 2012/0139830 A1 * | 6/2012 | Hwang | ................ | G06F 3/012 345/156 |
| 2012/0182294 A1 * | 7/2012 | Cordon Garcia | ..... | G06T 7/0028 345/419 |
| 2012/0306874 A1 * | 12/2012 | Nguyen | ................ | G06T 19/00 345/420 |
| 2013/0195428 A1 * | 8/2013 | Marks | ................ | H04N 5/93 386/278 |
| 2013/0329951 A1 * | 12/2013 | Kannan | ................ | G06T 7/2046 382/103 |
| 2013/0345491 A1 * | 12/2013 | Saitoh | ................ | A61B 5/0042 600/9 |
| 2014/0035934 A1 * | 2/2014 | Du | ................ | G06T 13/40 345/474 |
| 2015/0084950 A1 * | 3/2015 | Li | ................ | G06T 7/2046 345/419 |
| 2015/0213307 A1 * | 7/2015 | Beeler | ................ | G06K 9/00302 382/190 |
| 2015/0213604 A1 * | 7/2015 | Li | ................ | G06T 13/40 345/473 |

OTHER PUBLICATIONS

Alexander, O. et al., "The digital emily project: Achieving a photoreal digital actor," IEEE, Computer Graphics and Applications, 2010, vol. 30, No. 4, pp. 20-31.

(Continued)

*Primary Examiner* — Aaron W Carter
(74) *Attorney, Agent, or Firm* — Kilpatrick Townsend & Stockton LLP

(57) ABSTRACT

Systems and techniques for performing automatic rigid stabilization of facial expressions are provided. The systems and techniques may include obtaining one or more shapes, the one or more shapes including one or more facial expressions of a subject. The systems and techniques may further include generating a subject-specific skull representation, and performing rigid stabilization of the one or more facial expressions by fitting the subject-specific skull with the one or more facial expressions of the subject.

17 Claims, 16 Drawing Sheets

(56) References Cited

OTHER PUBLICATIONS

Amberg, B. et al., "Optimal landmark detection using shape models and branch and bound," Int. Conference on Computer Vision (ICCV), 2010.
Beeler, T. et al., "High-quality single-shot capture of facial geometry," ACM Trans. Graphics (Proc. SIGGRAPH), 2010, vol. 29, pp. 40:1-40:9.
Beeler, T. et al., "High-quality passive facial performance capture using anchor frames," ACM Trans. Graphics (Proc. SIGGRAPH), 2011, vol. 30, pp. 75:1-75:10.
Besl, P. J. et al., "A method for registration of 3-d shapes," IEEE Trans. PAMI, 1992, vol. 14, No. 2, pp. 239-256.
Blanz, V. et al., "A morphable model for the synthesis of 3d faces," Proc. SIGGRAPH, 1999, pp. 187-194.
Botsch, M. et al., "On linear variational surface deformation methods," IEEE TVCG, 2008, vol. 14, No. 1, pp. 213-230.
Bouaziz, S. et al., "Online modeling for realtime facial animation," ACM Trans. Graphics (Proc. SIGGRAPH), 2013, vol. 32, No. 4, pp. 40:1-40:10.
Bradley, D. et al., "High resolution passive facial performance capture," ACM Trans. Graphics (Proc. SIGGRAPH), 2010, vol. 29, pp. 41:1-41:10.
Cao, C. et al., "Facewarehouse: A 3d facial expression database for visual computing," IEEE TVCG, 2013.
Cao, C. et al., "3d shape regression for real-time facial animation," ACM Trans. Graphics (Proc. SIGGRAPH), 2013, vol. 32, No. 4, pp. 41:1-41:10.
Dale, K. et al., "Video face replacement," ACM Trans. Graphics (Proc. SIGGRAPH Asia), 2011, vol. 30, No. 6, pp. 130:1-130:10.
Fyffe, G. et al., "Comprehensive facial performance capture," Eurographics 2011, 2011, vol. 30, No. 2.
Ghosh, A. et al., "Multiview face capture using polarized spherical gradient illumination," ACM Trans. Graphics (Proc. SIGGRAPH Asia), 2011, vol. 30, No. 6, pp. 129:1-129:10.
Huang, H. et al., "Leveraging motion capture and 3d scanning for high-fidelity facial performance acquisition," ACM Trans. Graphics (Proc. SIGGRAPH), 2011, vol. 30, No. 4, pp. 74:1-74:10.
Li, H. et al., "Robust single-view geometry and motion reconstruction," ACM Trans. Graphics (Proc. SIGGRAPH Asia), 2009, vol. 28, No. 5, pp. 175:1-175:10.
Li, H. et al., "Example-based facial rigging," ACM Trans. Graphics (Proc. SIGGRAPH), 2010, vol. 29, No. 4, pp. 32:1-32:6.
Li, H. et al., "Realtime facial animation with on-the-fly correctives," ACM Trans. Graphics (Proc. SIGGRAPH), 2013, vol. 32, No. 4, pp. 42:1-42:10.
Ma, W.-C. et al., "Rapid acquisition of specular and diffuse normal maps from polarized spherical gradient illumination," Eurographics Symposium on Rendering, 2007, pp. 183-194.
Sumner, R. W. et al., "Deformation transfer for triangle meshes," ACM Trans. Graphics (Proc. SIGGRAPH), 2004, vol. 23, No. 3, pp. 399-405.
Vlasic, D. et al., "Face transfer with multilinear models," ACM Trans. Graphics (Proc. SIGGRAPH), 2005, vol. 24, No. 3, pp. 426-433.
Weise, T. et al., "Face/off: live facial puppetry," Proc. Symposium on Computer Animation, 2009, pp. 7-16.
Weise, T. et al., "Realtime performance-based facial animation," ACM Trans. Graphics (Proc. SIGGRAPH), 2011, vol. 30, No. 4, pp. 77:1-77:10.

* cited by examiner

RIGID STABILIZATION OF FACIAL EXPRESSIONS

CROSS REFERENCE TO RELATED APPLICATIONS

The present application is a non-provisional of and claims the benefit and priority under 35 U.S.C. 119(e) of U.S. Provisional Application No. 61/932,751 filed Jan. 28, 2014, entitled "RIGID STABILIZATION OF FACIAL EXPRESSIONS," the entire contents of which are incorporated herein by reference for all purposes.

FIELD

The present disclosure relates generally to rigid stabilization of facial expressions, and more specifically to automatic rigid stabilization of facial expressions.

BACKGROUND

Facial scanning techniques may be used to create digital doubles in media works. For example, facial scanning can be used to generate animated representations of a subject for a movie, a video game, or other media work. Facial scanning oftentimes includes capturing scans or images of a subject as the subject performs different facial expressions. The scans typically contain a superposition of the desired expression on top of unwanted rigid head movement. Rigid stabilization is a technique that may be used to extract true expression deformations of the subject by factoring out rigid head movement for each expression. Rigid stabilization is typically performed using a manual process. Manual processes for performing rigid stabilization are tedious, error prone, and lead to inaccurate results.

SUMMARY

Techniques and systems are described for performing automatic rigid stabilization of facial expressions. Rigid stabilization of facial expressions may also be referred to herein as face stabilization. In some examples, automatic face stabilization may include indirectly stabilizing facial expressions of a subject by aligning the expressions with a subject-specific skull representation. The subject-specific skull representation may include an estimate of the underlying skull of the subject. In some embodiments, the subject-specific skull representation may be generated by deforming a generic skull representation to a shape or other representation of an expression of the subject. The shape or other representation may include a three-dimensional (3D) geometry of the expression, such as a 3D mesh of the expression, a 3D point cloud of the expression (with correspondences between points), or any other appropriate representation. One or more facial landmarks may be used to guide deformation of the generic skull representation to the shape of the subject. One or more anatomically-motivated constraints may be used to align the facial expressions of the subject with the subject-specific skull representation. For example, the one or more facial landmarks may be used along with the subject-specific skull representation to establish the anatomically-motivated constraints, which may then be used to guide the automatic stabilization. By using the techniques and systems disclosed herein to automatically perform face stabilization, professional-quality results on large sets of facial expressions may be achieved that outperform results of manual techniques while requiring minimal computation time (e.g., less than a second or other period of time).

According to at least one example, a computer-implemented method may be provided that includes obtaining one or more shapes, the one or more shapes including one or more facial expressions of a subject. The method further includes generating a subject-specific skull representation, and performing rigid stabilization of the one or more facial expressions by fitting the subject-specific skull with the one or more shapes of the subject.

In some embodiments, a system may be provided that includes a memory storing a plurality of instructions and one or more processors. The one or more processors are configurable to: obtain one or more shapes, the one or more shapes including one or more facial expressions of a subject; generate a subject-specific skull representation and perform rigid stabilization of the one or more facial expressions by fitting the subject-specific skull with the one or more shapes of the subject.

In some embodiments, a computer-readable memory storing a plurality of instructions executable by one or more processors may be provided. The plurality of instructions comprise: instructions that cause the one or more processors to obtain one or more shapes, the one or more shapes including one or more facial expressions of a subject; instructions that cause the one or more processors to generate a subject-specific skull representation; and instructions that cause the one or more processors to perform rigid stabilization of each of the one or more facial expressions by fitting the subject-specific skull with the one or more shapes of the subject.

In some embodiments, the method, system, and computer-readable memory described above may further include wherein generating the subject-specific skull representation includes fitting a generic skull representation with a shape of the subject. In some embodiments, the image of the subject includes a neutral facial expression of the subject. In some embodiments, generating the subject-specific skull includes obtaining a set of facial landmarks on the image of the subject, and using the set of facial landmarks to fit the generic skull representation to the image of the subject. In some embodiments, generating the subject-specific skull includes performing rigid transformation to align the generic skull representation to the image of the subject. In some embodiments, the generic skull is non-rigidly deformed to fit a facial expression of the subject in the image.

In some embodiments, the method, system, and computer-readable memory described above may further include generating one or more constraints using the subject-specific skull representation, the one or more constraints being used to constrain fitting of the subject-specific skull with the one or more facial expressions of the subject. In some embodiments, the one or more constraints include a skin constraint, a nose constraint, or both a skin constraint and a nose constraint. The skin constraint constrains a distance from a skin surface to the subject-specific skull representation based on skin deformation of an expression. The nose constraint constrains a distance from a nose-tip on a skin surface to a nose-tip on the subject-specific skull representation based on deformation of a nose in an expression.

In some embodiments, the method, system, and computer-readable memory described above may further include wherein performing rigid stabilization includes performing non-linear optimization of a combination of energy values.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Human facial animation is an important and widespread topic of computer graphics. However, it is also one of the most challenging tasks, since audiences are well-trained to identify even the slightest inaccuracies in facial performances, which can lead to strong feelings of unfamiliarity and a valley effect. The computer graphics industry continues to strive for realistic digital three-dimensional (3D) face animation. Face animation is typically performed using a blend-shape face rig, which consists of a set of face shapes that span the range of desired expressions of the character. Using this rig, new poses for animation can be created by blending different amounts of the expression shapes together. The quality of the final animation depends highly on the quality of the underlying blend-shapes.

Face blend-shapes can be created through manual sculpting, which is common for creatures and other fictional characters. However, for human-like characters the blend-shapes are usually reconstructed by scanning images of real subjects or actors performing the expressions. High resolution digital facial scanning is a growing trend in the entertainment industry. The trend may be attributed to increasing demand for photorealistic digital actors, coupled with recent advances in high quality facial reconstruction. In addition to entertainment demands, facial expression capture is a key element of statistical face analysis, for example in a FaceWarehouse database. Subject-specific blend-shape rigs are also captured for real-time facial animation.

Figure 1:
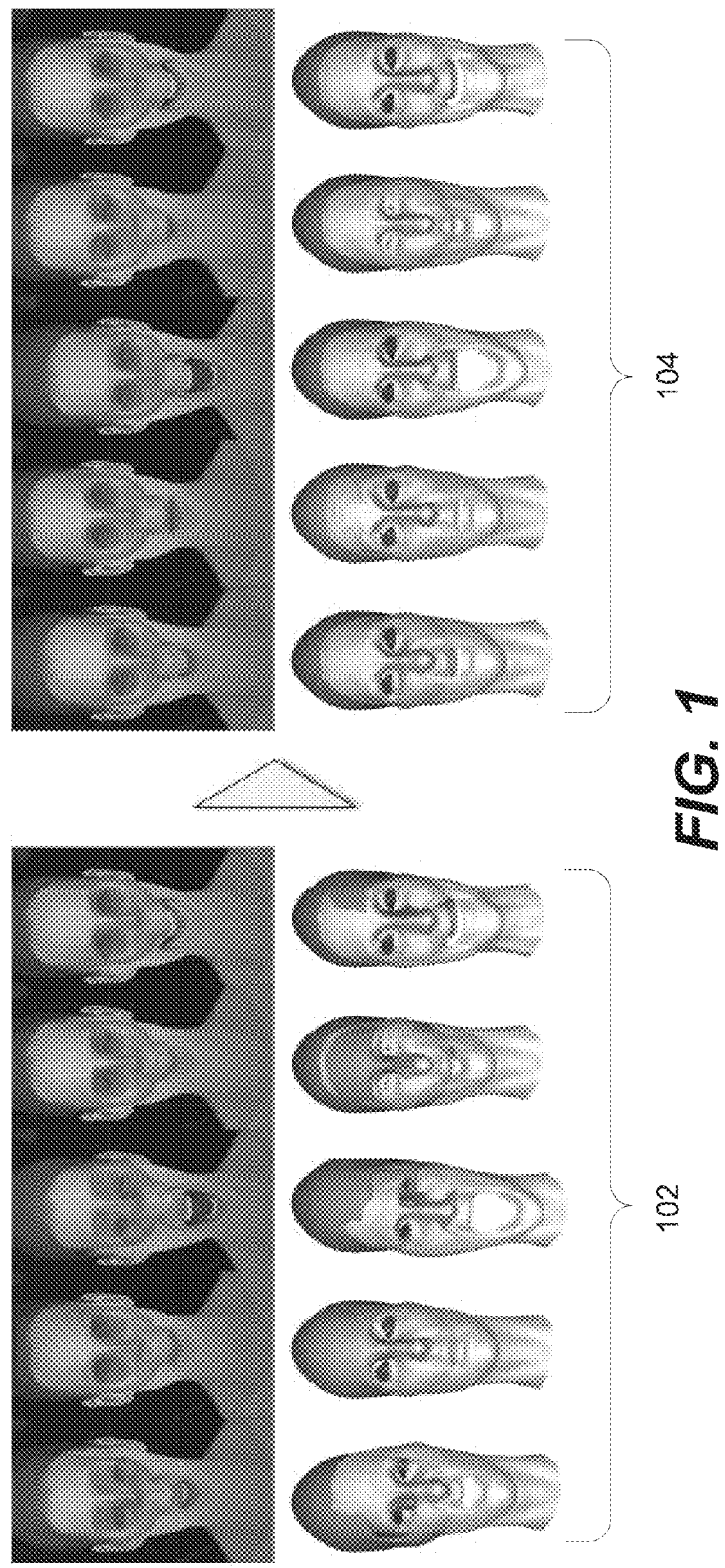
FIG. 1 illustrates an example of results obtained by performing rigid stabilization of facial expressions, in accordance with an embodiment of the present invention.

A problem that arises when scanning subjects performing different expressions is that the resulting scans contain both expression movement as well as rigid head movement. The head movement may be caused by the subject not being able to keep their head still while performing a wide range of expressions. As a result, the scans may contain a superposition of the desired expression on top of unwanted rigid head movement. FIG. 1 illustrates captured facial expressions 102 of a subject. The expressions 102 contain superposition of rigid transformation due to head motion on top of the non-rigid deformation caused by the expression. If the expression shapes contain rigid motion caused by the head movement, then any facial animation or statistical analysis constructed from the expressions will also contain the unwanted rigid head motion. The scanned expressions may be rigidly aligned to a common frame of reference. This alignment process is referred to as rigid stabilization or face stabilization. Rigid stabilization of the facial expressions may be used to extract true expression deformations of the subject by factoring out rigid head movement for each expression. In order to achieve production-quality results, face stabilization is typically performed through a tedious and error-prone manual process, which may take several months of manual work for current movie productions.

Techniques and systems are described for performing automatic rigid stabilization of facial expressions. FIG. 1 further illustrates resulting shapes 104 obtained using automatic rigid stabilization of the facial expressions. Since human faces can undergo a wide range of deformation, points on the skin surface do not move rigidly with the underlying skull. As described herein, the rigid stabilization estimates and removes the rigid transformation caused by the head motion given observations of the non-rigidly deforming skin, which allows automatic extraction of the pure facial expression, as illustrated by the shapes 104. The systems and the techniques described herein may provide various advantages. For example, the systems and techniques may provide stabilization of facial expressions at production-level quality. The systems and techniques provide results quickly, and are automatic after initialization of the subject. Furthermore, anatomical properties, such as the underlying skull, may be automatically inferred from facial scans. The systems and techniques outperform existing techniques and achieve high quality results both quantitatively and qualitatively on different subjects.

The techniques and systems described herein take advantage of the fact that relative motion and the change in shape of skin to the underlying skull is constrained by human anatomy. For example, skin slides over the skull and buckles as a consequence of underlying muscular activity. It is thus advantageous to explicitly fit the skull to the expressions considering these anatomical constraints. The rigid transformation between any two given expressions can be computed from the transformations of the skull. For example, given a reference shape $\hat{F}$ with corresponding skull $\hat{S}$ and a deformed shape F, the underlying rigid transformation T of the skull may be determined such that it fits F. Transforming F by the inverse $T^{-1}$ yields the desired stabilization with respect to the reference shape $\hat{F}$.

Figure 2:
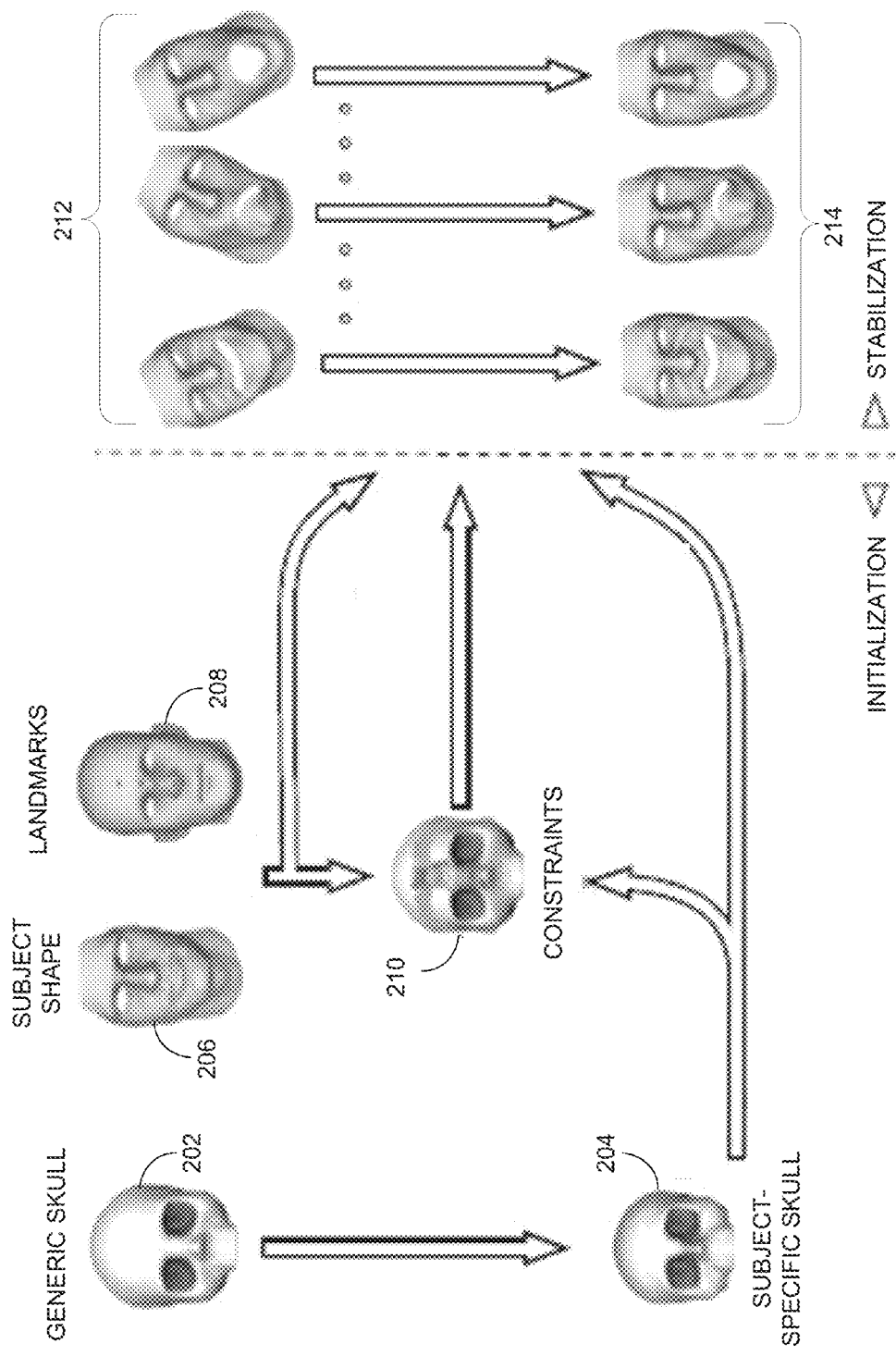
FIG. 2 illustrates an example of an overview of a technique for automatic rigid stabilization of facial expressions, in accordance with an embodiment of the present invention.

FIG. 2 illustrates an example overview of a technique for automatic rigid stabilization of facial expressions. In some examples, automatic face stabilization may include indirectly stabilizing facial expressions 212 of a subject by aligning the expressions 212 with a subject-specific skull representation 204. The subject-specific skull representation 204 may include an estimate of the underlying skull of the subject. In some embodiments, the subject-specific skull representation 204 may be generated by deforming a generic skull representation 202 to a shape 206 of the subject. In some embodiments, the subject-specific skull representation 204 may be generated using other techniques. For example, a user may create the subject-specific skull representation 204 by hand, such as using a computer-automated design tool, or other appropriate technique. As another example, the subject-specific skull representation 204 may be generated based on an image of the subject, such as an X-ray, a digital image, or other appropriate image. The shape 206 may include a representation of a facial expression of the subject. For example, the shape 206 may include a 3D geometry of the expression, such as a 3D mesh of the expression, a 3D point cloud of the expression with correspondences between different points in the point cloud, or any other appropriate representation. In some examples, the shape 206 may be created based on a scanned image of the subject, based on depth sensor input, or any other appropriate technique for generating a 3D representation of the subject.

The automatic face stabilization techniques and systems described herein may include an initialization stage and a stabilization stage. During the initialization stage, underlying anatomically-motivated constraints 210 may be generated that drive the stabilization stage. The initialization stage includes annotating a sparse set of facial landmarks 208, fitting a generic skull representation 202 to the subject's face, and establishing the constraints 210. In some embodiments, these steps are performed only once per subject. In one example, during initialization, the generic skull representation 202 may be fitted or deformed to the shape 206 of the subject. The shape 206 may include a neutral shape of the subject with a neutral facial expression. One or more facial landmarks 208 may be used to guide deformation of the generic skull representation 202 to the shape 206 of the subject. Subject-specific constraints 210 may also be established. After initialization, the stabilization stage may include using the subject-specific skull representation 204 and the constraints 210 to automatically stabilize facial expressions of input shapes 212 of the subject to produce shapes 214 with the subject's pure facial expressions extracted. Similar of the shape 206, the shapes 212 may include representations of the expressions of the subject, such as a 3D geometry of each expression, a 3D mesh of each expression, a 3D point cloud of each expression with correspondences between different points in the point cloud, or any other appropriate representation. The anatomically-motivated constraints 210 may be used to align the shapes 212 of the subject with the subject-specific skull representation 204. For example, the facial landmarks 208 may be used along with the subject-specific skull representation 204 to establish the anatomically-motivated constraints 210, which may then be used to guide the automatic stabilization. Further details regarding the automatic rigid stabilization techniques of FIG. 2 will be described with respect to FIGS. 3-8.

Figure 3:
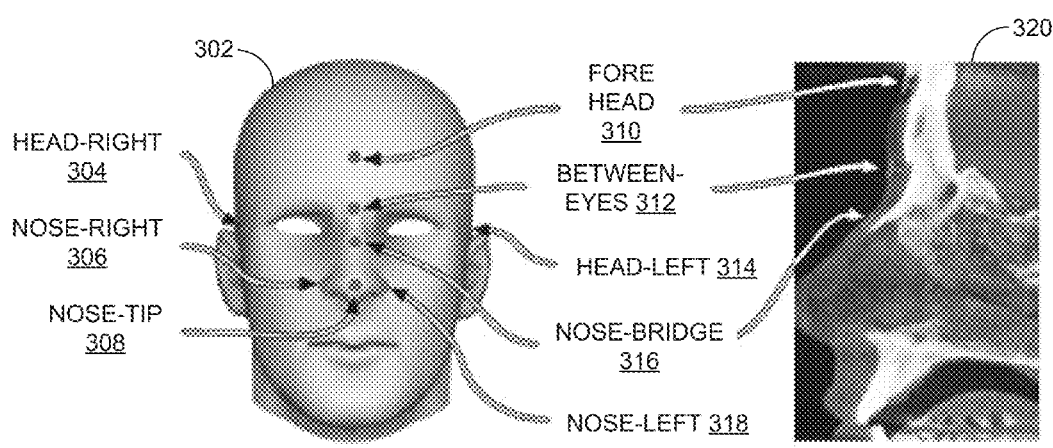
FIG. 3 illustrates an example of facial landmarks, in accordance with an embodiment of the present invention.

FIG. 3 illustrates a set of facial landmarks of a subject. The facial landmarks may include a sparse set of facial landmarks annotated on a neutral shape 302 of the subject. The landmarks include the sides of the head including head-right 304 and head-left 314. The landmarks also include the forehead 310 and between-eyes 312. Further, the landmarks include the nose-bridge 316, the nose-tip 308, and the sides of the nose including nose-right 306 and nose-left 318. While specific landmarks are described herein, one of ordinary skill in the art will appreciate that any other points on a subject's face may be used as facial landmarks. In some embodiments, annotation of the facial landmarks is only required once per subject. In some embodiments, the landmarks may be specified manually or may be specified automatically using a landmark detection algorithm. Landmarks may be chosen based on various factors. For example, landmarks such as the head-right 304, head-left 314, forehead 310, and between-eyes 312 landmarks may be chosen because they include positions on a subject's face that are close to the bone of the underlying skull 320. As another example, the nose-bridge 316, the nose-tip 308, the nose-right 306, and the nose-left 318 landmarks may be chosen based on the anatomically-motivated constraints used in later steps. For example, the nose-based landmarks 306, 308, 316, and 318 may be chosen to quantify the shape of the nose. As described below, the landmarks may be used to fit the generic skull representation to the subject and to create a nose constraint.

Figure 4A:
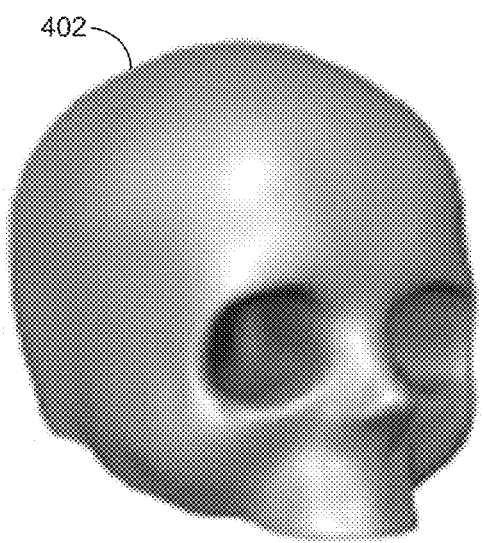
FIG. 4A illustrates an example of a generic skull representation, in accordance with an embodiment of the present invention.
Figure 4B:
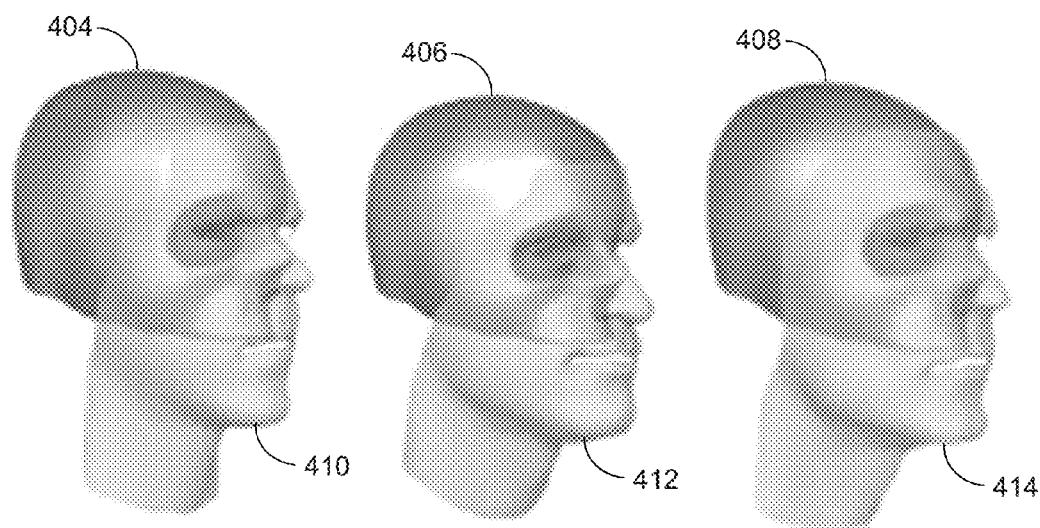
FIG. 4B illustrates an example of fitting of a generic skull representation to different subjects, in accordance with an embodiment of the present invention.

FIG. 4A illustrates an example of a generic skull representation 402. The generic skull representation 402 is fit or deformed to a shape of the subject to generate a subject-specific skull. FIG. 4B illustrates an example of deformed skulls 404, 406, and 408 for different subjects 410, 412, and 414 based on fitting of the generic skull representation 402 to the subjects 410, 412, and 414. Five of the facial landmarks for the subject discussed with respect to FIG. 3, including head-right 304, head-left 314, forehead 310, between-eyes 312, and nose-bridge 316, have correspondences on the generic skull representation 402. As the skull lies underneath the skin, the features of the skull that correspond to the landmarks can be found along a normal direction from the landmarks, at a distance equal to the tissue thickness at the landmark points. Typical tissue thicknesses (6, below) may be retrieved from a human CT scan. In one example, tissue thickness between the forehead 310 landmark and the corresponding point on the skull may be 4.5 mm, tissue thickness for the between-eyes 312 landmark may be 7 mm, tissue thickness for the nose-bridge 316 landmark may be 2 mm, tissue thickness for the head-left 314 landmark may be 3.5 mm, and the tissue thickness for the head-right 304 landmark may be 3.5 mm. One of ordinary skill in the art will appreciate that other tissue thicknesses between the landmarks and the underlying skull may be obtained and used in fitting the generic skull representation 402 to a subject.

A rigid transformation $T^S$ may be computed to align the generic skull representation 402 to a shape of the subject by minimizing the sum of euclidean distances between the correspondences. The shape (e.g., shape 410, 412, or 414) may include a neutral shape of the subject with a neutral facial expression, similar to the shape 206 illustrated in FIG. 2. Differences in scale may be accounted for by scaling the skull landmarks (correspondences) such that the average distance to the barycenter corresponds to that of the facial landmarks. After transforming the skull representation by $T^S$, the skull representation may be deformed non-rigidly to fit the subject's face using iterative linear shell deformation employing the correspondences C as hard constraints $d_c$. The linear shell deformation minimizes bending and stretching energies for the displacements d:

$$\min_{d} E_{shell}(d) + \sum_{i \in S} \omega_i \|\delta_i n_i - d_i\|^2 \quad (1)$$
$$\text{s.t. } d_c = x_c - x_c^* - n_c^s \delta_c; c \in C.$$

Initially, all $w_i$ are set to zero, suppressing soft constraints. Soft constraints will be introduced in subsequent iterations. According to Equation 1, the hard deformation constraints $d_c$ are given by the difference of the position $x_c$ on the subject's face at a point to the corresponding position $x_c^s$ on the skull, offset along its normal $n_c^s$ by the typical tissue thickness $\delta_c$ at the point. While the deformed skull may not fit the subject's face everywhere, it yields a good initialization for iterative optimization of the linear shell deformation. In every iteration, the distance $\delta^*_i$ along the normal $n^s_i$ to the surface of the face is computed for every vertex $x^s_i$ on the skull. Depending on $\delta^*_i$, soft deformation constraints $\delta_i$ and the according weights $w_i$ are defined as:

if $\delta^*_i = \inf \rightarrow \delta_i = 0, \omega_i = 0$                                                   1.

if $\delta^*_i < \delta_{min} \rightarrow \delta_i = \delta_{min}, \omega_i = \lambda[(\delta^*_i - \delta_{min})^2 + 1]$,        2.

if $\delta^*_i > \delta_{max} \rightarrow \delta_i = \delta_{max}, \omega_i = \lambda/[(\delta^*_i - \delta_{max})^2 + 1]$,    3.

otherwise $\rightarrow \delta_i = \delta^*_i, \omega_i = \lambda$.                                4.

In some embodiments, $\delta_{min} = 2$ mm, $\delta_{max} = 7$ mm, and $\lambda = 1$ may be used for all results discussed herein. The parameter $\lambda$ is a user provided parameter to control the fitting, described in further detail below. One of ordinary skill in the art will appreciate that other appropriate values may be used for the minimum distance $\delta_{min}$, maximum distance $\delta_{max}$, and the parameter $\lambda$. Given these soft constraints, the linear shell deformation is applied again to update and optimize the skull deformation. These steps may be repeated until the deformation converges. Convergence may occur, for example, after a small number of iterations, such as 2 or 3. One of ordinary skill in the art will appreciate that other techniques may be used to generate the subject-specific skull representation. For example, the subject-specific skull representation may be generated by a user, such as using a computer-automated design tool or other appropriate technique. As another example, the subject-specific skull representation may be generated based on an image of the subject, such as an X-ray, a digital image, or other appropriate image.

Once the subject-specific skull is generated for the subject, subject-specific anatomical constraints may be created that should be satisfied when fitting the subject-specific skull to facial expressions of the subject. In some embodiments, two anatomical constraints may be created. For example, a skin constraint may be created that maintains a certain distance between the subject-specific skull and the skin, while incorporating changing tissue thickness due to deformation. The skin constraint constrains a distance from a skin surface of the subject to a corresponding point on the subject-specific skull representation based on skin deformation of a given expression. The second constraint may include a nose constraint that constrains the distance between the tip of the nose and the skull, considering the amount of strain on the nose. The nose constraint constrains the distance from the nose-tip on the subject's skin surface to a nose-tip on the subject-specific skull representation based on deformation of the subject's nose in a given expression. The skin and nose constraints are sufficient for high-quality stabilization. As described below, one or more other constraints may also be created.

Figure 5:
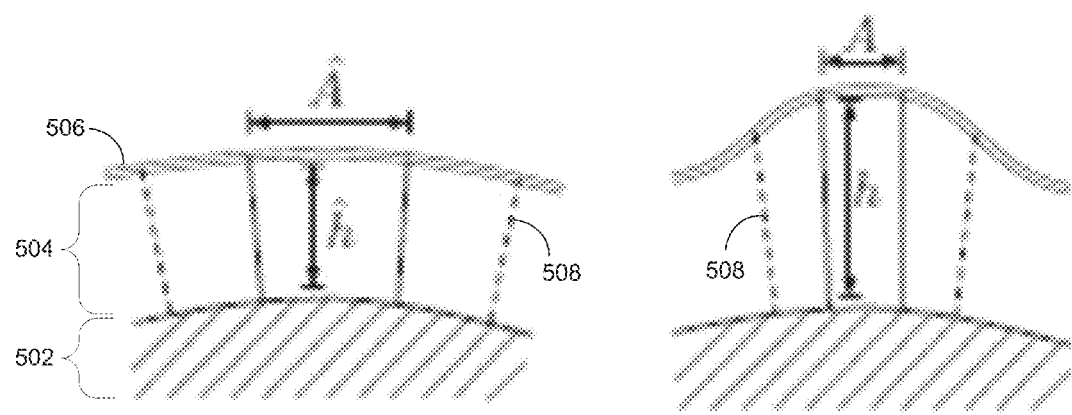
FIG. 5 illustrates an example of the interaction between skin and tissue of a subject relative to a skull of the subject, in accordance with an embodiment of the present invention.

Skin constraints may be determined for multiple points on the subject's face. For example, as illustrated in FIG. 2, skin constraints are determined for points corresponding to the head-right 304, forehead 310, between-eyes 312, head-left 314, and nose-bridge 316 facial landmarks. Determination of the skin constraints is based on the property of skin being stretched and compressed during facial deformation by the subject as a consequence of muscular activity while the skin slides over the skull. FIG. 5 illustrates the relationship between the skin 506, the tissue 504, and the skull 502. If it is assumed that the volume within a small patch of skin remains constant (e.g., the volume within the dotted lines 508 depicted in FIG. 5), the skin thickness h(x) can be predicted at a given position x as function of the surface area ratio ϵ(x) and rest state skin thickness ĥ (x) as:

$$h(x) = \xi(x)\hat{h}(x) = \frac{\hat{A}(x)}{A(x)}\hat{h}(x), \quad (2)$$

where A(x) is the surface area, approximated by the weighted average of discs centered at x through neighboring vertices $x_i$. The area ratio can be rewritten as:

$$\xi(x) = \frac{1}{\sum_{i \in N(x)} w_i} \sum_{i \in N(x)} w_i \frac{\|x_i - x\|}{\|\hat{x}_i - \hat{x}\|}, \quad (3)$$

where the constraint weights $w_i$ are computed according to:

$$w_i = \frac{(\ell - \|x_i - x\|)^2}{\ell^2} \quad (4)$$

for vertices in the neighborhood N(x) of x that are closer than 2l to x. In this example, l=1 cm, but may be set to other values in different examples.

Figure 6:
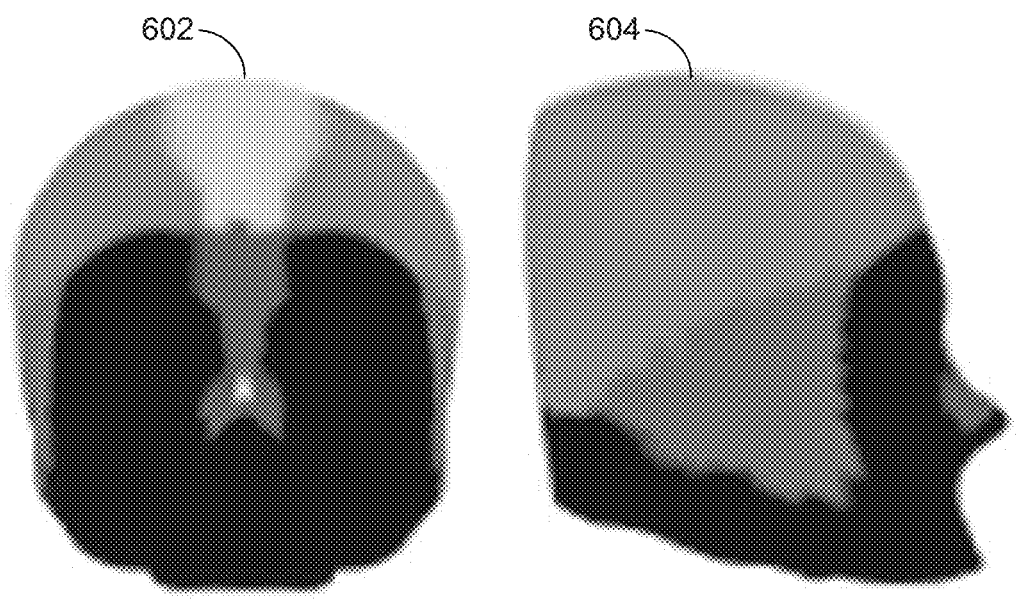
FIG. 6 illustrates an example of a weight map used for skin constraints, in accordance with an embodiment of the present invention.

The assumption of constant local tissue volume may not be satisfied everywhere on the face of the subject. For example, local volume may increase when muscles bulge. To account for this, a spatially varying weight map may be defined for enforcing the skin constraint weights higher or lower in different facial regions, guided by anatomy. In some instances, thin tissue areas without underlying muscles, such as the bridge of the nose, may best fulfill the volume assumption. FIG. 6 illustrates a weight map for the skin constraints (the brighter, the higher the weight and the darker, the lower the weight). The map contains values p, which will be used to weight the influence of the skin constraints when fitting a shape of the subject with the subject-specific skull. In some embodiments, the weight map may include a per-point map or array that includes different weight values for different points for a shape of the subject.

Figure 7A:
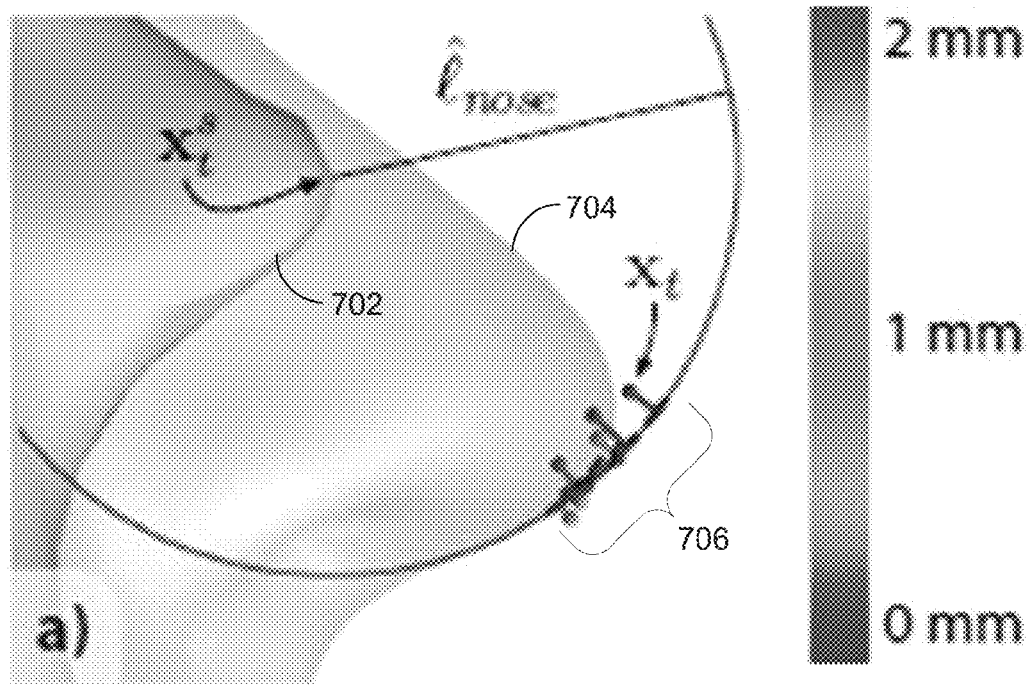
FIG. 7A illustrates an example of a nose constraint determination with respect to nose length, in accordance with an embodiment of the present invention.

FIG. 7A illustrates a relationship between a nose 704 of the subject relative to the subject's skull 702. The nose constraint may be determined in order to preserve a distance $l_{nose}$ from the tip $x_t$ of the nose 704 to the corresponding nose tip $x^s_t$ on the skull 702. The lower part of the nose includes cartilage covered by a thin layer of skin tissue. Skin sliding is minimal, especially around the nose tip, and the skin attached to the underlying cartilage can be considered. Cartilage is not rigid and thus any motion by the subject may cause an elastic deformation of the nose. This deformation, however, can be defined. As illustrated in FIG. 7A, the point $x_t$ at the tip of the nose 704 primarily exhibits a rotation around the nose tip $x^s_t$ on the skull 702, with only little compression and stretching. The spheres 706 mark the position of the tip of the nose 704 for several ground truth shapes, which are manually stabilized to the skull. Use of ground truth shapes is discussed in further detail below with respect to quantitative evaluation of the techniques described herein. The lines and coloring of the spheres 706 indicate the discrepancy of the points to the predicted distance $l_{nose}$. The nose constraint is designed to preserve the distance:

$$l_{nose} = v\hat{l}_{nose} = v\|\hat{x}_i - x^*_i\|, \quad (5)$$

Where $vl_{nose}$ is an estimation of the compression of the nose. The compression $vl_{nose}$ is estimated from the Cauchy strains between a subset of the landmarks determined using the techniques described above. For example, the compression $vl_{nose}$ may be estimated from the strains between the nose-bridge 316 and the nose-left 314 landmarks ($e^{b-l}$), the strains between the nose-bridge 316 and the nose-right 306 landmarks ($e^{b-r}$), the strains between the nose-bridge 316 and the nose-tip 308 landmarks ($e^{b-t}$), the strains between the nose-tip 308 and the nose-left 314 landmarks ($e^{t-l}$), and the strains between the nose-tip 308 and nose-right 306 landmarks ($e^{t-r}$):

$$v = 1 + 0.2(e^{b-l} + e^{b-r} + e^{b-t} - e^{t-l} - e^{t-r}). \quad (6)$$

One of ordinary skill in the art will appreciate that the function of Equation 6 is only one example of a function for estimating the nose shape, and that other appropriate functions could be used to estimate nose shape.

Figure 7B:
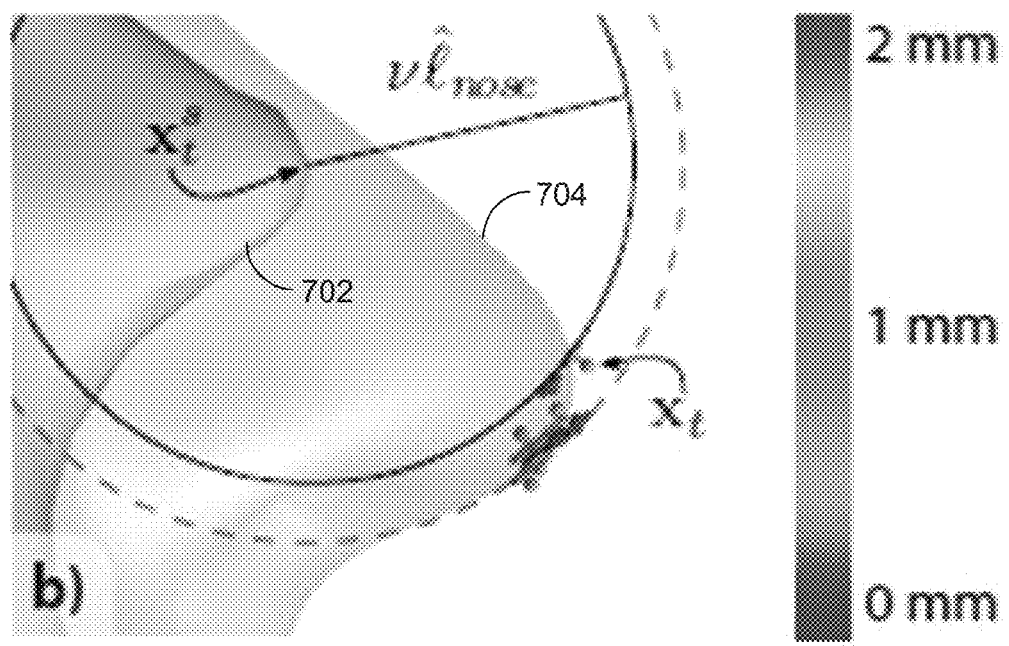
FIG. 7B illustrates an example of a nose constraint determination with respect to nose length and compression, in accordance with an embodiment of the present invention.

As illustrated in FIG. 7B, incorporating the compression $Vl_{nose}$ reduces the error on the predicted nose length $l_{nose}$, thus improving the predicted distance and reducing the discrepancy of the resulting point to the predicted distance.

One of ordinary skill in the art will appreciate that any number of other constraints may be created. For example, teeth constraints may be created for the position of the upper teeth (when available). The upper teeth are rigidly attached to a subject's skull, and thus transform rigidly with the skull. When the teeth are visible in a given shape of a subject, they can be directly used as constraints. Additionally aligning the upper teeth during the fitting may provide even better quality for expressions in which teeth are visible. As another example, eye constraints may be created. While a subject's eye may rotate often, it translates very little, and thus may be used as a constraint when visible in a given shape. Deformation constraints may also be created. Not every point on a subject's face has the same amount of motion. For example, a point on the lips may move often in all directions, while a point on the forehead may move predominately in one direction and much less in others directions. This information could be used as constraints during the fitting. Even further, positional constraints may be created. Some points on the face move less often than other points on the face. For example, points on the inner corners of the eye or points behind the ear do not experience much motion. These different positional constraints may be used to constrain the skin position of a subject. These examples may include special cases of deformation constraints, where the deformation is minimal in all axes. As yet another example, since every face is different, learning strategies may be employed to adopt constraints to a subject's individual anatomy.

Given the subject-specific anatomical constraints described above, automatic stabilization of facial expressions may be performed using the subject-specific skull. An input expression F may be pre-stabilized by computing a rigid transformation that best aligns the same subset of landmarks as those used for the generic skull fitting described above. As a result, a coarse, initial registration of the subject-specific skull with each shape of the subject may be obtained using the landmarks. This rough alignment provides a good initialization for the following optimization that uses non-linear optimization techniques.

Stabilization may include a non-linear optimization, minimizing an energy function of the form:

$$E_{tot} = \lambda_{skin} E_{skin} + \lambda_{nose} E_{nose}, \quad (7)$$

over the translation t and the rotation r, a total of six degrees of freedom. The subject-specific skull may thus be fit with the shape. The fitting or alignment can take place either relative to the skull or relative to the current shape. Accordingly, the subject-specific skull may be fit to the shape, or the shape may be fit to the subject-specific skull. Both approaches may be similar in complexity and performance. In some embodiments, aligning the skull to the face may be used because sampling density and distribution of the skin constraints over the skull surface remain constant even if the face exhibits extreme deformations.

The different energy terms $E_{skin}$ and $E_{nose}$ may be determined and may indicate how well the fitting of the subject-specific skull is for a given shape. The energy terms can be used to determine how much to adjust the fitting. The energy terms are weighted equally for all results described herein (e.g., $\lambda_{skin}=\lambda_{nose}=1$).

In embodiments in which skin constraints and nose constraints are used, as described above, the energy terms may include skin energy and nose energy. In embodiments in which other constraints are used in addition to or in lieu of skin and nose constraints, other energies may also be determined. These additional energies may then be added to the total energy $E_{tot}$.

The skin energy is chosen such that it tolerates sliding over the skull but penalizes deviation from the predicted tissue thickness. The skin energy can be used to check how well the subject-specific skull, in its current position relative to a given subject shape, fulfills the assumption of the skin thickness. The skin energy is defined over all points on the subject-specific skull as:

$$E_{skin} = \sum_{i \in S} w_{skin}(x_i, \rho_i) \|(x_i - x_i^*)n_i^* - \xi(x_i)\hat{h}_i\|^2. \quad (8)$$

The terms in Equation 8 are given as:

$x_i^s = T(r,t)\hat{x}_i^s$ $n_i^s = T(r,0)\hat{n}_i^s$ $x_i^* = \chi(\mathcal{F}, x_i^s, n_i^s)$ $\hat{h}_i = \|\hat{x}_i^s - \chi(\hat{\mathcal{F}}, \hat{x}_i^s, \hat{n}_i^s)\|,$ where $T(r, t)$ denotes the transformation given rotation r and translation t vectors, $\hat{x}^s$ and $\hat{n}^s$ are the skull position and normal in the current reference frame, $E(x)$ computes the stretch at position x as defined in Equation 3, and $\chi(F; x; n)$ computes the first intersection with the shape F of a ray starting at the point x in direction n.

As described above, the assumption of constant volume may not hold in general (e.g. due to muscle bulging). The more skin compresses or stretches, the less accurate this assumption becomes. The weight $w_{skin}$ of a skin constraint may thus be reduced depending on the stretch $\epsilon(x)$ as:

$$w_{skin}(x, \rho) = \frac{\rho}{\kappa_{skin}(\xi(x) - 1)^2 + 1} \quad (9)$$

where $\rho$ are the weight values of the weight map, as described above, and $K_{skin}$ is a user provided parameter that controls how quickly the weight decays with increasing stretch. In some embodiments, $K_{skin}=1$ for all results described herein. One of ordinary skill in the art will appreciate that other appropriate values for $K_{skin}$ may be used.

The nose energy penalizes deviation from the predicted nose length. The nose energy is defined as:

$$E_{nose} = w_{nose}(v)\|(\|x_t - T(r, t)\hat{x}_t^s\|) - \ell_{nose}\|^2 \quad (10)$$

where $x_t$ denotes the tip of the nose on the deformed shape, $\hat{x}_t^s$ is the position of the nose tip on the skull at the reference frame, and as for the skin constraints, $T(r; t)$ denotes the transformation given rotation r and translation t vectors. The estimated nose length $l_{nose}$ and compression v are computed as described in Equations 5 and 6, respectively. The predicted nose length $l_{nose}$ is an approximation and may be less accurate the more the nose compresses or stretches. Therefore, the influence of the nose constraint may be reduced based on the estimated compression as:

$$w_{nose}(v) = \frac{1}{\kappa_{nose}(v-1)^2 + 1} \quad (11)$$

where $K_{nose}$ is a user provided parameter that controls how quickly the weight decays with increasing compression. In some embodiments, $K_{nose}=1$ for all results described herein. One of ordinary skill in the art will appreciate that other appropriate values for $K_{skin}$ may be used.

The resulting combination of energy terms $E_{skin}$ and $E_{nose}$ yields a non-linear optimization problem ($E_{total}$ above). In some embodiments, the non-linear optimization problem may be solved using a Levenberg-Marquart algorithm. One of ordinary skill in the art will appreciate that other appropriate techniques may be used to solve the non-linear optimization problem. Convergence may occur quickly (e.g., between 10-20 iterations) and since every expression shape of the subject is stabilized independently, the techniques described herein can be used to efficiently stabilize large datasets.

Figure 8:
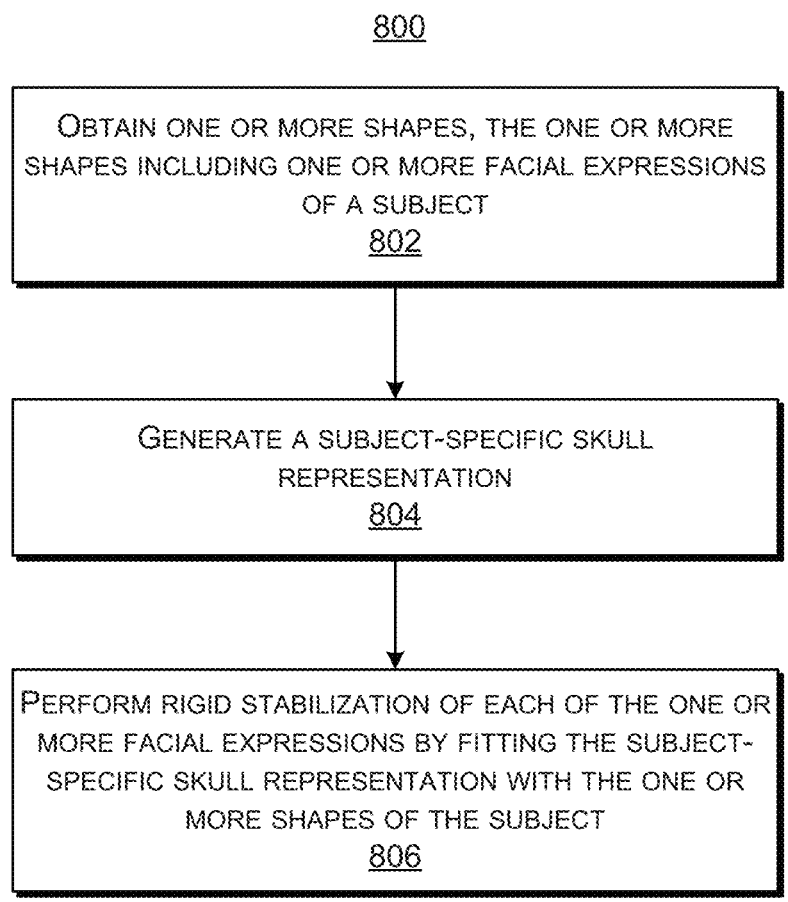
FIG. 8 illustrates an example of a process of automatic rigid stabilization of facial expressions, in accordance with one embodiment of the present invention.

FIG. 8 illustrates an example of a process 800 of automatic rigid stabilization of facial expressions. Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 16:
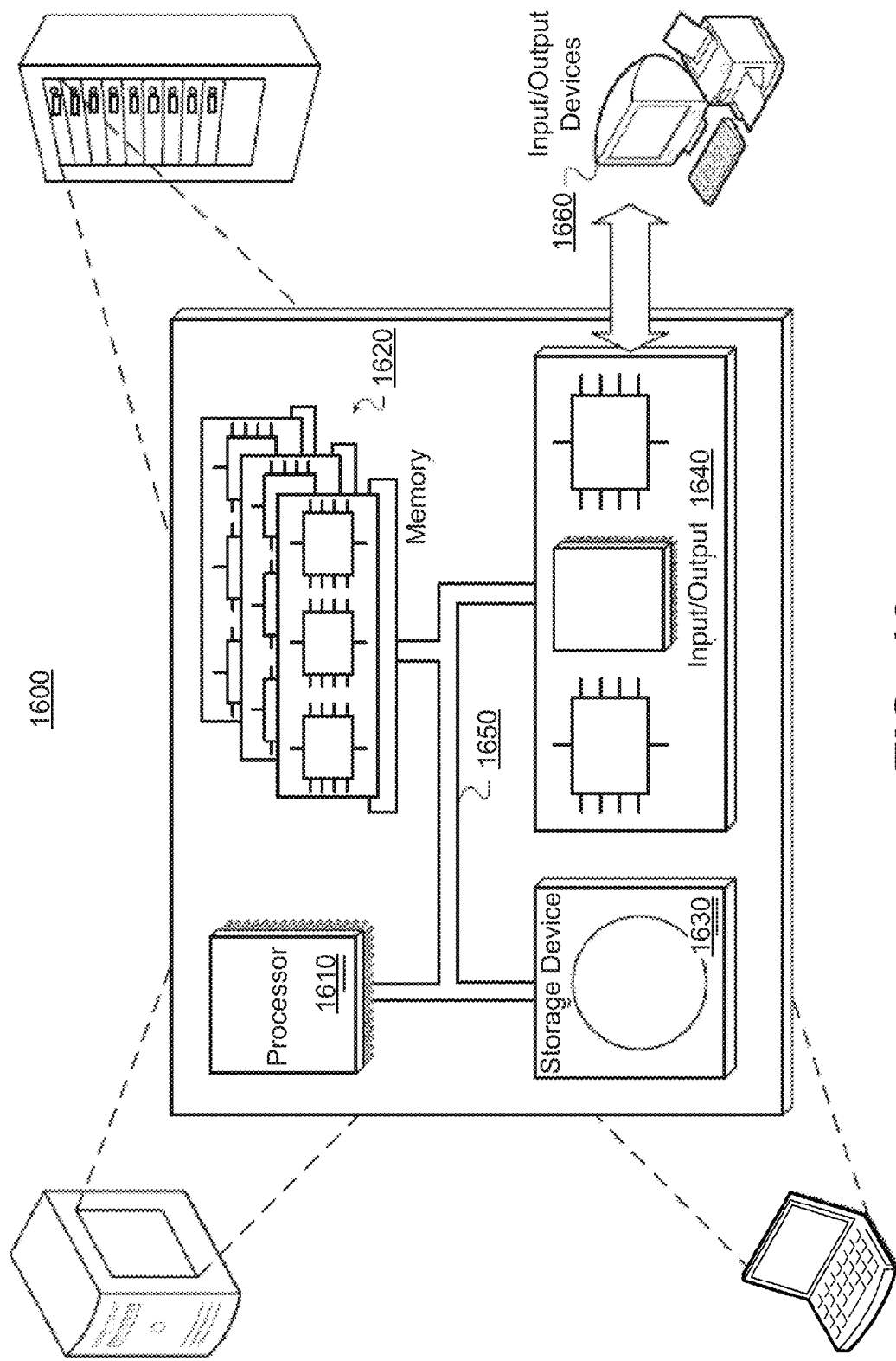
FIG. 16 shows an example of a computer system that may be used in various embodiments of the present invention.

In some aspects, the process 800 may be performed by a computing device, such as the computer system 1600 shown in FIG. 16.

At 802, the process 800 includes obtaining one or more shapes, the one or more shapes including one or more facial expressions of a subject. For example, the one or more shapes may include the shapes 212 illustrated in FIG. 2. The one or more shapes may include representations of the one or more expressions of the subject. For example, a shape may include a 3D geometry of an expression, such as a 3D mesh of the expression, a 3D point cloud of the expression with correspondences between different points in the point cloud, or any other appropriate representation. In some examples, a shape may be created based on a scanned image of the subject, based on depth sensor input, or any other appropriate technique for generating a 3D representation of the subject.

At 804, the process 800 includes generating a subject-specific skull representation. In some embodiments, generating the subject-specific skull includes fitting a generic skull representation with a shape of the subject. In some embodiments, the subject-specific skull representation may be generated using a computer-automated design tool or other appropriate tool. In some embodiments, the subject-specific skull representation may be generated based on an image of the subject, such as an X-ray, a digital image, or other appropriate image. In some embodiments, the shape of the subject includes a neutral facial expression of the subject, as described above. The shape may include the shape 206 illustrated in FIG. 2. In some embodiments, generating the subject-specific skull includes obtaining a set of facial landmarks on the shape of the subject, similar to that discussed above with respect to FIG. 3. The set of facial landmarks can be used to fit the generic skull representation to the shape of the subject. For example, the facial landmarks may be used to determine correspondences to the generic skull based on a normal direction from the landmarks to the skull and different determined thicknesses between the face and the skull. In some embodiments, generating the subject-specific skull further includes performing rigid transformation to align the generic skull representation to the shape of the subject. In some embodiments, the generic skull is then non-rigidly deformed to fit a facial expression of the subject in the shape. For example, iterative linear shell deformation may be used to non-rigidly deform the generic skull to the neutral facial expression of the subject.

At 806, the process 800 includes performing rigid stabilization of the one or more facial expressions by fitting the subject-specific skull with the one or more shapes of the subject. For example, one or more of the techniques described above with respect to FIGS. 2-7 may be used to perform rigid stabilization of each of the facial expressions using the subject-specific skull.

In some embodiments, the process 800 may include generating one or more constraints using the subject-specific skull representation. The one or more constraints may be used to constrain fitting of the subject-specific skull with the one or more facial expressions of the subject, as described above with respect to FIGS. 2-7. The constraints may include a skin constraint or a nose constraint, or both a skin constraint and a nose constraint. The skin constraint constrains a distance from a skin surface to the subject-specific skull representation based on skin deformation of an expression. For example, during the fitting, the skin constraint for a certain point on the subject's face may assume the skin and tissue maintains its volume when the skin changes due to underlying muscle activation (e.g., the skin compresses). The skin constraint at a point on the subject's face may be used to measure the change of area at that point as the subject's expression changes, which can be used to predict how far behind the skin the skull should be in the stabilized shape. For example, if the skin compresses, the area will be reduced and the skin will bulge out. Based on the constant volume and the area, the distance from the skull can be determined. The nose constraint constrains a distance from a nose-tip on a skin surface to a nose-tip on the subject-specific skull representation based on deformation of a nose in an expression. For example, during the fitting, the nose constraint may be used to constrain the length of the subject's nose from the tip of the nose to the nose-tip of the skull, as described above. In some embodiments, the constraint may include another constraint, such as a constraint for the position of the upper teeth of the subject, an eye constraint for one or more eyes of the user, one or more deformation constraints, one or more positional constraints, or the like. In some embodiments, a weight map may be used to weight the influence of the constraints when fitting a shape of the subject with the subject-specific skull.

In some embodiments, performing rigid stabilization includes performing non-linear optimization of a combination of energy values. For example, different energy terms may be determined that correspond to any determined constraints. The energy terms indicate how well the fitting of the subject-specific skull is for a given expression in a shape of the subject. The energy terms can be used to determine how much to adjust the fitting. In some embodiments, the energy terms may include skin energy and nose energy, but may include any other energy terms as additional constraints are used.

FIGS. 9-15 illustrate various quantitative and qualitative results of the rigid stabilization systems and techniques described herein. Assessing the rigid stabilization results qualitatively poses a significant challenge since even millimeter inaccuracies in stabilization are visible in dynamic facial animations, but are difficult to visualize in print. An upper teeth indicator may be used to assess the results due to the upper teeth being rigidly attached to the skull. The upper teeth may be used to assess the performance whenever they are visible in a given shape or image. If a stabilization method successfully aligns a model of the teeth to a shape or image for each expression, it provides a good indication that the stabilization is accurate. Furthermore, when teeth are not incorporated as constraints in the optimization of the rigid stabilization, the quality achieved on expressions where they are visible can be considered representative for all expressions (whether teeth are visible or not).

Figure 9:
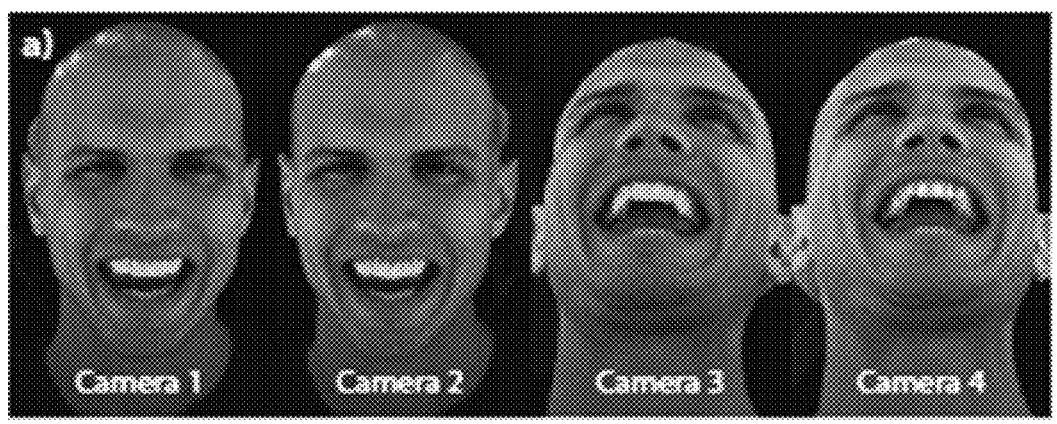
FIG. 9 illustrates an example of results obtained using automatic rigid stabilization of facial expressions, in accordance with one embodiment of the present invention.
Figure 10:
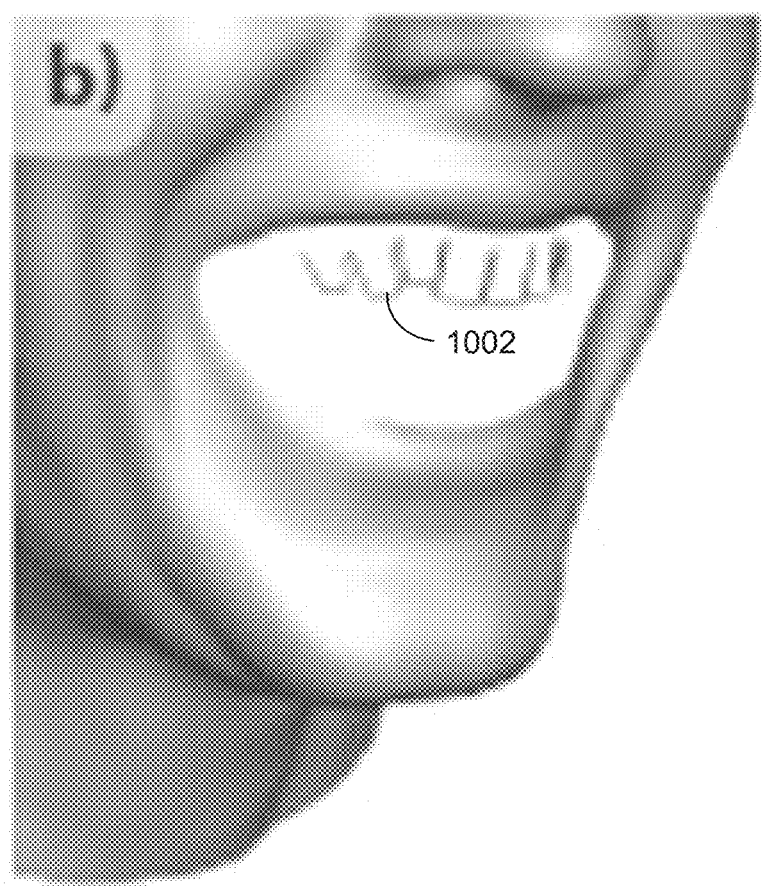
FIG. 10 illustrates an example of results obtained using automatic rigid stabilization of facial expressions, in accordance with one embodiment of the present invention.

To reconstruct a model of a subject's teeth in 3D, the outlines of the a number of frontal upper teeth may be drawn (e.g., manually drawn or drawn using a computing device) for one of the expressions where they are visible from a number of camera angles. The outlines of the frontal upper teeth may be referred to as Teeth-Frame $F_T$. For example, FIG. 9 shows outlines drawn in a yellow color for eight frontal upper teeth of a subject for an expression from four different cameras or camera angles. The outlines may be triangulated to produce the outline in 3D, which can be transformed rigidly into the reference frame. FIG. 10 shows the triangulated shape 1002 transformed into the reference frame. The resulting teeth model can be used for qualitative evaluation of the rigid stabilization results.

Ground truth data may be generated. The ground truth data may include, for example, a subset of fifteen manually-stabilized shapes for one subject. The rigid stabilization techniques described herein may be quantitatively evaluated by comparing the results to the ground truth data. Since the alignment of the upper teeth gives additional queues for the stabilization, manual fitting may be performed only on those shapes where the upper teeth are visible, and the teeth model was made available to the subject. The subject may be made to stabilize the same set of shapes a second time without using the teeth model, thus providing a measurable indication of the quality achievable by manual stabilization on expressions where the teeth are not visible.

Given the ground truth data and the upper teeth as an indicator of quality, the rigid stabilization techniques described herein may be evaluated in comparison to previous work and manual stabilization when no teeth are used. Previous methods include, for example, iterative closest points (ICP) and Procrustes alignment. As can be seen in Table 1, the proposed techniques perform significantly better than previous techniques and even outperform manual rigid stabilization done by a user. For both ICP and Procrustes alignment, only the upper part of the face is considered to avoid negative influence of the jaw and neck motion. Without this masking, ICP and Procrustes algorithms perform considerably worse, as indicated in Table 1. For the remaining discussion, the rigid stabilization techniques described herein will be compared only to the masked versions of ICP and Procrustes in order to provide the best possible comparison.

TABLE 1

Quantitative Results

| Method | Mean [mm] | StdDev [mm] | Max [mm] |
|---|---|---|---|
| ICP | 2.17 | 1.14 | 4.52 |
| No Mask | 3.20 | 2.51 | 8.54 |
| Procrustes | 2.16 | 1.13 | 4.52 |
| No Mask | 3.50 | 1.69 | 6.38 |
| Manual (no teeth) | 1.15 | 0.57 | 2.10 |
| Autom. Stabilization using Skull | 0.89 | 0.49 | 2.06 |

Table 1 lists mean, standard deviation, and maximal errors for different methods when compared to hand stabilized shapes using the teeth as reference. The automatic stabilization technique of the present invention performs significantly better than existing techniques and even outperforms the same human operator when not using the teeth. The commonly used Procrustes distance in millimeters (mm) is used as the error measure.

Figure 11:
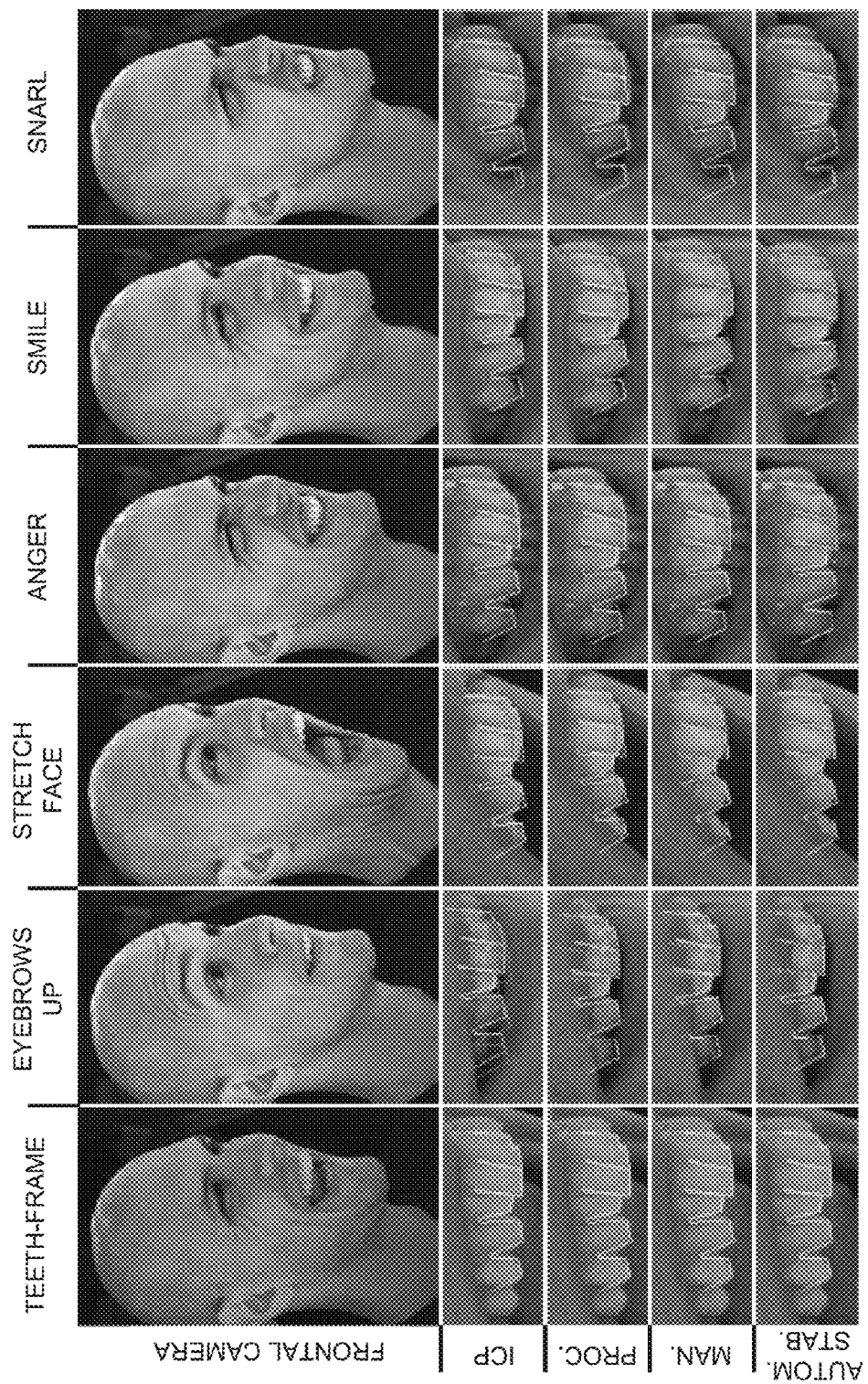
FIG. 11 illustrates an example of comparisons between results obtained using the automatic rigid stabilization of facial expressions techniques described herein and results obtained using various other techniques, in accordance with one embodiment of the present invention.

To visualize the quality of the stabilizations, the rigid transformations T may be applied to the teeth model and the outline may be projected into the respective images of a subject. A comparison with the previous techniques is shown in FIG. 11. The ground truth Teeth-Frame $F_T$ is illustrated in a yellow color, and the results produced by each of the techniques are shown in a blue color. Note that the manual annotation and reconstruction is not perfectly accurate in itself and that the results must therefore be assessed relative to the Teeth-Frame $F_T$.

Figure 12:
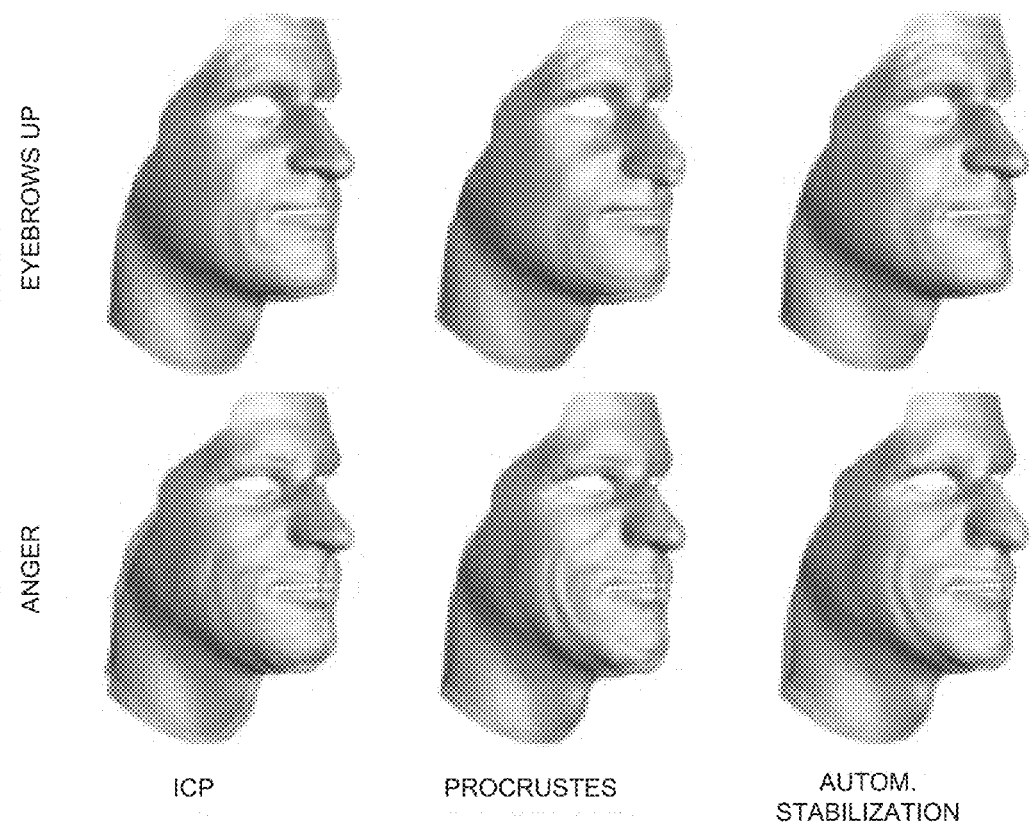
FIG. 12 illustrates an example of shape comparisons between results obtained using the automatic rigid stabilization of facial expressions techniques described herein and results obtained using various other techniques, in accordance with one embodiment of the present invention.

In general, ICP and Procrustes show similar average performance, but both exhibit problems for expressions where the shape changes substantially. For example, as illustrated in FIG. 12, the ICP and Procrustes techniques are problematic when the subject performs an expression that includes wrinkling the forehead or scrunching the nose. These algorithms do not perform well for such expressions since they estimate the transformation directly from the observed skin, which is heavily deforming. For example, the ICP and Procrustes techniques suffer from large misalignments. The techniques described herein are able to provide superior results as compared to the ICP and Procrustes techniques by making use of anatomical constraints to estimate the transformation indirectly.

Figure 13:
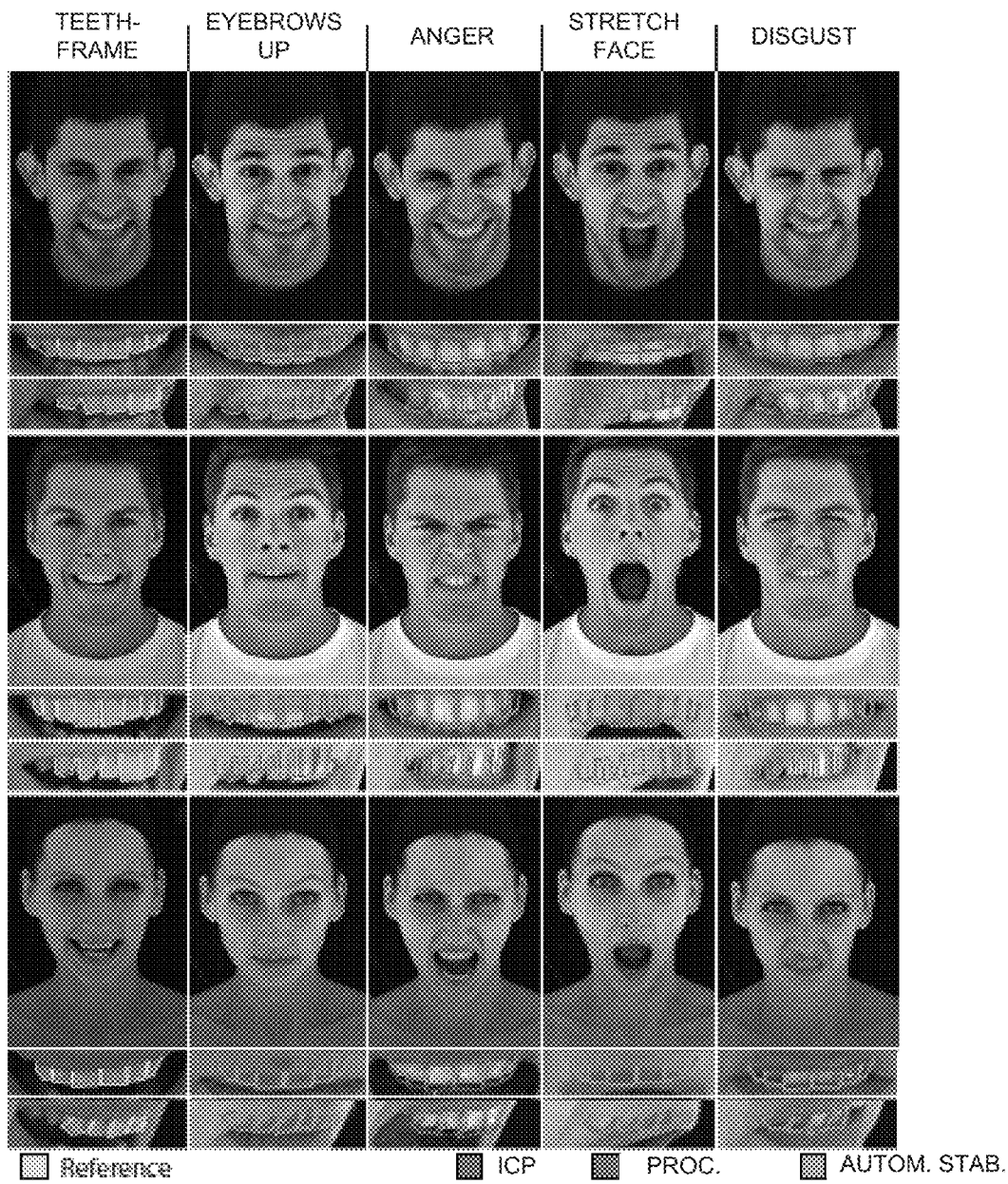
FIG. 13 illustrates an example of comparisons between results obtained for different subjects using the automatic rigid stabilization of facial expressions techniques described herein and results obtained for the subjects using various other techniques, in accordance with one embodiment of the present invention.

FIG. 13 shows stabilization results using the different techniques for extremal expressions performed by different subjects. All subjects may be stabilized with the same set of parameters and exhibit comparable quality, demonstrating the robustness of the techniques described herein. The ground truth Teeth-Frame $F_T$ is illustrated in a yellow color. The results produced by the ICP technique are shown in a blue color, the results produced by the Procrustes technique are shown in a pink color, and the results produced using the automatic face stabilization techniques described herein are shown in a green color. The leftmost column shows the outline of the teeth (yellow) in the frame they were reconstructed in (See FIGS. 9-10). The other columns show the stabilization results for ICP (blue), Procrustes (magenta), and automatic face stabilization (green) for four different expressions. Zoom regions are shown from both front and side views.

Figure 14:
FIG. 14 illustrates an example of comparisons between performance results obtained using the automatic rigid stabilization of facial expressions techniques described herein and performance results obtained using various other techniques, in accordance with one embodiment of the present invention.

FIG. 14 shows stabilizations for some frames out of a longer sequence. The results shown in FIG. 14 are temporally more consistent than the other techniques even though the stabilization is performed on each frame independently without any explicit temporal continuity.

Figure 15:
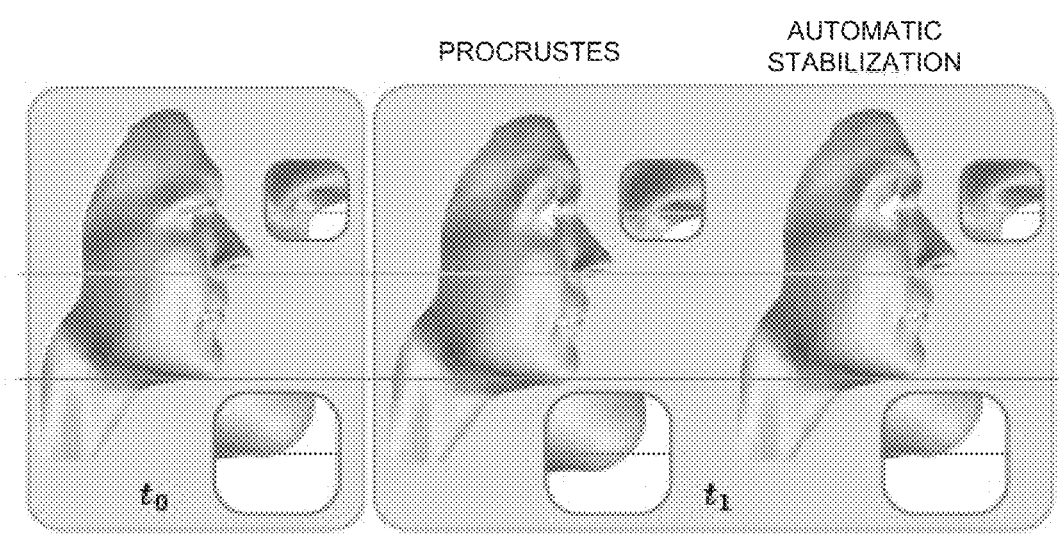
FIG. 15 illustrates an example of a comparison between results obtained using automatic rigid stabilization to stabilize facial expressions used to build a blend-shape model and performance results obtained using various other techniques to stabilize the facial expressions to build a blend-shape model, in accordance with one embodiment of the present invention.

The techniques described herein may be used to stabilize facial expressions that are used to build a blend-shape facial animation model. Using an animation constructed by an animator, blend-shape weights may be directly transferred to replica models built after stabilization using ICP and Procrustes, respectively. The resulting animations using the previous techniques contain unwanted rigid motion that the artist would not be expecting, caused by errors in stabilization. FIG. 15 illustrates an example showing unwanted rigid motion in an animation resulting from a Procrustes technique. Two frames $t_0$ and $t_1$ of an animation are shown comparing a blend-shape model stabilized using a Procrustes technique and a blend-shape model stabilized using the automatic stabilization techniques described herein. For the Procrustes-stabilized blend-shapes, the chin moves down whenever the character wrinkles his forehead. The automatic stabilization techniques described herein, on the other hand, enable artifact-free animation.

Using the automatic face stabilization techniques described above, facial expressions may be stabilized at a level of quality on par or exceeding that done by human operators. The time and effort required for rigid stabilization can be in the order of several man-months for a single production, and with the increasing demand for digital doubles, face stabilization will quickly become a bottleneck in coming years. The techniques described herein not only provide consistent high-quality results and major time savings, but will also facilitate other research directions such as anatomical simulation or simplified eye tracking.

Referring to FIG. 16, a schematic diagram is shown of an example of a computer system 1600. This system is exemplary only and one having skill in the art will recognize that variations and modifications are possible. The system 1600 can be used for the operations described above. For example, the computer systems shown in FIG. 16 may be used to implement any or all of the initialization (e.g., face annotation, skull fitting, constraint creation) and stabilization (e.g., skin energy determination, nose energy determination) techniques and routines described herein.

The system 1600 includes a processor 1610, a memory 1620, a storage device 1630, and an input/output interface 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to provide graphical information via input/output interface 1640 for display on a user interface of one or more input/output device 1660.

The memory 1620 stores information within the system 1600 and may be associated with various characteristics and implementations. For example, the memory 1620 may include various types of computer-readable medium such as volatile memory, a non-volatile memory and other types of memory technology, individually or in combination.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1660 provides input/output operations for the system 1600. In one implementation, the input/output device 1660 includes a keyboard and/or pointing device. In another implementation, the input/output device 1660 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of rigid stabilization, comprising:
   obtaining one or more shapes, the one or more shapes including one or more facial expressions of a subject;
   generating a subject-specific skull representation, wherein generating the subject-specific skull representation includes fitting a generic skull representation with a shape of the subject, the fitting including aligning the generic skull representation to the shape of the subject and non-rigidly deforming the generic skull representation to fit the shape of the subject; and performing rigid stabilization of the one or more facial expressions by fitting the subject-specific skull representation with the one or more shapes of the subject, wherein performing the rigid stabilization removes, from the one or more facial expressions, rigid transformation caused by head motion of the subject.

2. The method of claim 1, wherein the shape of the subject includes a neutral facial expression of the subject.

3. The method of claim 1, wherein generating the subject-specific skull representation includes obtaining a set of facial landmarks on the shape of the subject, and using the set of facial landmarks to fit the generic skull representation with the shape of the subject.

4. The method of claim 1, further comprising:
generating one or more constraints using the subject-specific skull representation, the one or more constraints being used to constrain fitting of the subject-specific skull representation with the one or more shapes of the subject.

5. The method of claim 4, wherein the one or more constraints include a skin constraint, wherein the skin constraint constrains a distance from a skin surface to the subject-specific skull representation based on skin deformation of an expression.

6. The method of claim 4, wherein the one or more constraints include a nose constraint, wherein the nose constraint constrains a distance from a nose-tip on a skin surface to a nose-tip on the subject-specific skull representation based on deformation of a nose in an expression.

7. The method of claim 1, wherein performing rigid stabilization includes performing non-linear optimization of a combination of energy values.

8. A system, comprising:
a memory storing a plurality of instructions; and
one or more processors configurable to:
obtain one or more shapes, the one or more shapes including one or more facial expressions of a subject;
generate a subject-specific skull representation, wherein generating the subject-specific skull representation includes fitting a generic skull representation with a shape of the subject, the fitting including aligning the generic skull representation to the shape of the subject and non-rigidly deforming the generic skull representation to fit the shape of the subject; and
perform rigid stabilization of the one or more facial expressions by fitting the subject-specific skull representation with the one or more shapes of the subject, wherein performing the rigid stabilization removes, from the one or more facial expressions, rigid transformation caused by head motion of the subject.

9. The system of claim 8, wherein the shape of the subject includes a neutral facial expression of the subject.

10. The system of claim 9, wherein generating the subject-specific skull representation includes obtaining a set of facial landmarks on the shape of the subject, and using the set of facial landmarks to fit the generic skull representation with the shape of the subject.

11. The system of claim 8, wherein the one or more processors are further configurable to:
generate one or more constraints using the subject-specific skull representation, the one or more constraints being used to constrain fitting of the subject-specific skull representation with the one or more facial expressions of the subject.

12. The system of claim 11, wherein the one or more constraints include at least one or more of a skin constraint or a nose constraint, wherein the skin constraint constrains a distance from a skin surface to the subject-specific skull representation based on skin deformation of an expression, and wherein the nose constraint constrains a distance from a nose-tip on a skin surface to a nose-tip on the subject-specific skull representation based on deformation of a nose in an expression.

13. The system of claim 8, wherein performing rigid stabilization includes performing non-linear optimization of a combination of energy values.

14. A computer-readable memory storing a plurality of instructions executable by one or more processors, the plurality of instructions comprising:
instructions that cause the one or more processors to obtain one or more shapes, the one or more shapes including one or more facial expressions of a subject;
instructions that cause the one or more processors to generate a subject-specific skull representation, wherein generating the subject-specific skull representation includes fitting a generic skull representation with a shape of the subject, the fitting including aligning the generic skull representation to the shape of the subject and non-rigidly deforming the generic skull representation to fit the shape of the subject; and
instructions that cause the one or more processors to perform rigid stabilization of the one or more facial expressions by fitting the subject-specific skull representation with the one or more shapes of the subject, wherein performing the rigid stabilization removes, from the one or more facial expressions, rigid transformation caused by head motion of the subject.

15. The computer-readable memory of claim 14, wherein generating the subject-specific skull representation includes obtaining a set of facial landmarks on a shape of the subject, and using the set of facial landmarks to fit the generic skull representation with the shape of the subject.

16. The computer-readable memory of claim 14, the plurality of instructions further comprising:
instructions that cause the one or more processors to generate one or more constraints using the subject-specific skull representation, the one or more constraints being used to constrain fitting of the subject-specific skull representation with the one or more facial expressions of the subject, wherein the one or more constraints include at least one or more of a skin constraint or a nose constraint, wherein the skin constraint constrains a distance from a skin surface to the subject-specific skull representation based on skin deformation of an expression, and wherein the nose constraint constrains a distance from a nose-tip on a skin surface to a nose-tip on the subject-specific skull representation based on deformation of a nose in an expression.

17. The computer-readable memory of claim 14, wherein performing rigid stabilization includes performing non-linear optimization of a combination of energy values.

* * * * *